United States Patent
Fukano et al.

(10) Patent No.: US 6,775,287 B1
(45) Date of Patent: Aug. 10, 2004

(54) OUTPUT BUFFER TYPE ATM EXCHANGE DEVICE AND MULTICAST CONTROL METHOD

(75) Inventors: Maki Fukano, Tokyo (JP); Koushin Shimada, Fukuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/568,592

(22) Filed: May 11, 2000

(30) Foreign Application Priority Data

May 13, 1999 (JP) .......................................... 11-133370

(51) Int. Cl.[7] .......................... H04L 12/28; H04L 12/56
(52) U.S. Cl. ..................... 370/395.1; 370/417; 370/432
(58) Field of Search ............................. 370/389, 395.1, 370/432, 535–538, 542–544, 398, 412–418, 392, 390

(56) References Cited

U.S. PATENT DOCUMENTS

| | | | | |
|---|---|---|---|---|
| 5,689,506 A | * | 11/1997 | Chiussi et al. ............... | 370/388 |
| 5,784,003 A | * | 7/1998 | Dahlgren .................... | 340/2.2 |
| 6,320,864 B1 | * | 11/2001 | Hebb et al. .................. | 370/412 |
| 6,324,165 B1 | * | 11/2001 | Fan et al. .................... | 370/232 |
| 6,574,232 B1 | * | 6/2003 | Honig et al. ................. | 370/413 |

FOREIGN PATENT DOCUMENTS

| | | |
|---|---|---|
| JP | 3-48549 | 3/1991 |
| JP | 4-23646 | 1/1992 |
| JP | 7-283818 | 10/1995 |
| JP | 9-93257 | 4/1997 |

* cited by examiner

*Primary Examiner*—Ajit Patel
*Assistant Examiner*—Yvonne Quy Ha
(74) *Attorney, Agent, or Firm*—Young & Thompson

(57) ABSTRACT

An output buffer type ATM (Asynchronous Transfer Mode) exchange device and a multicast control method enable retrieval processing to bit map table for the sake of multicast control to delay, and which are capable of answering to be large capacity of the bit map table. The multicast control method of the output buffer type ATM exchange device multiplexes the cell inputted from a plurality of input ports during input cell period. The method accumulates unicast cell from among the cell distributed from a time division multiple bus into output buffer corresponding to the output port respectively. The method outputs the unicast cell to corresponding output port while synchronizing with output cell period. The method accumulates temporarily multicast cell into the multicast cell buffer from among the cells distributed from the time division multiple bus, then, picking the multicast output port information indicating the output port of multicast cell from the bit map table in every output cell period, before implementing output arrangement between every respective output ports obtained as the multicast output port information and the unicast cell accumulated in the output buffer, thus outputting the multicast cell to corresponding a plurality of output ports preferentially.

4 Claims, 7 Drawing Sheets

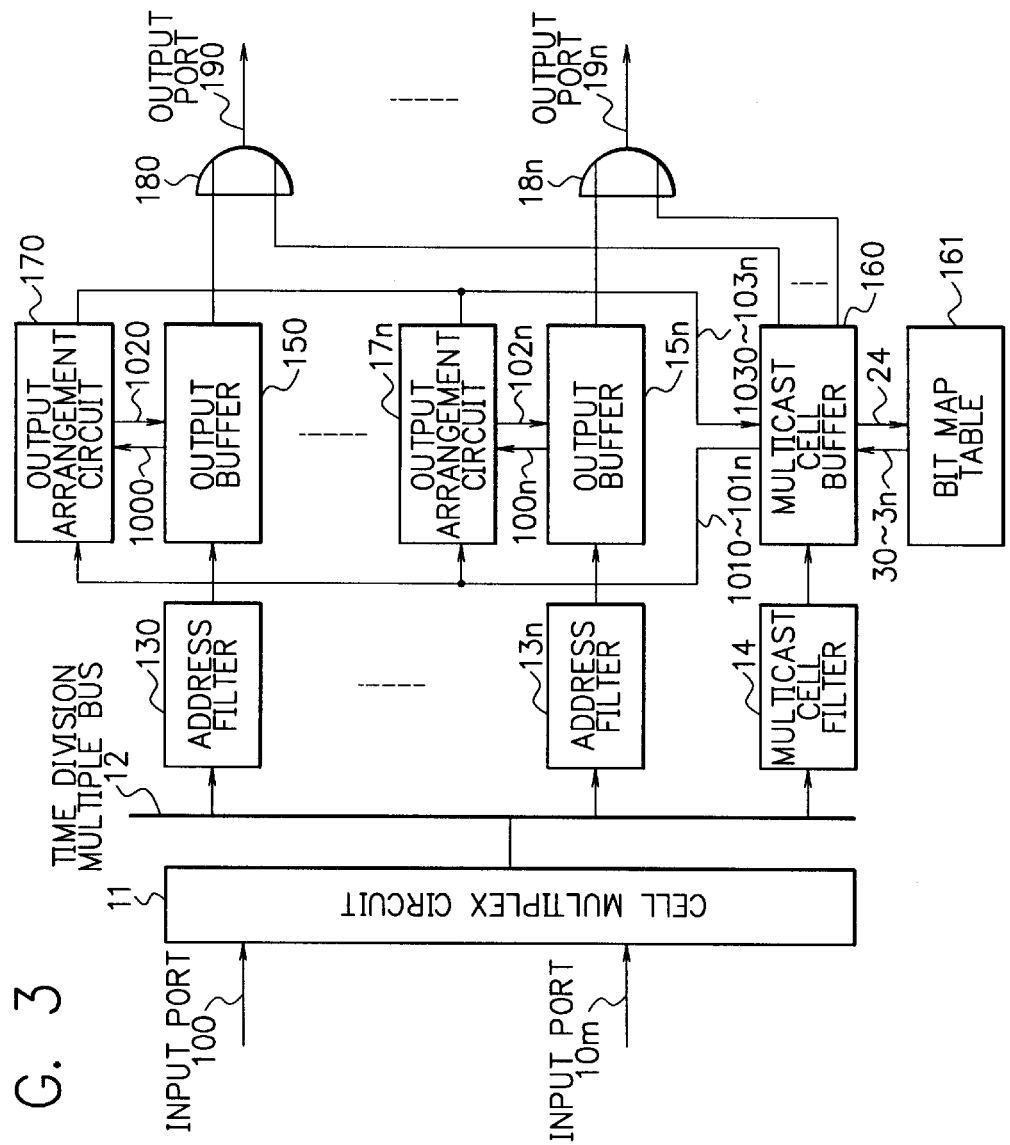
F I G. 3

F I G. 6A 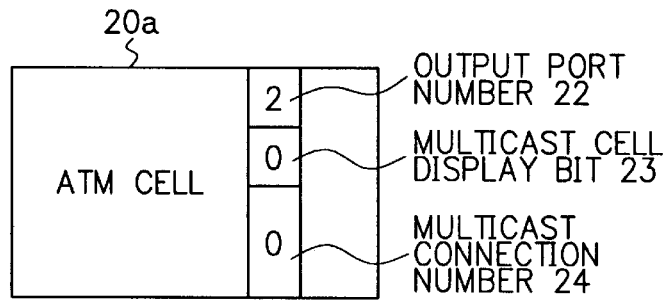
F I G. 6B 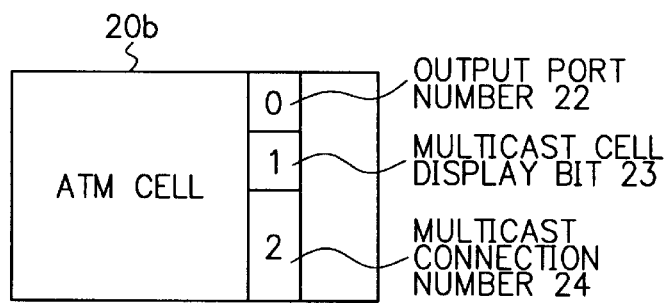
F I G. 6C 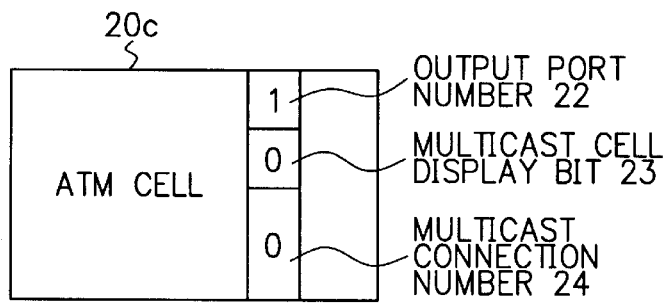
F I G. 6D 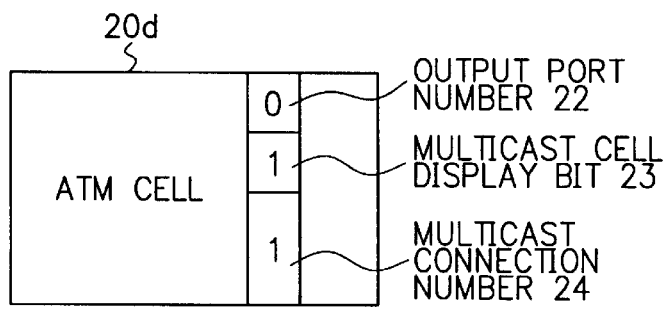

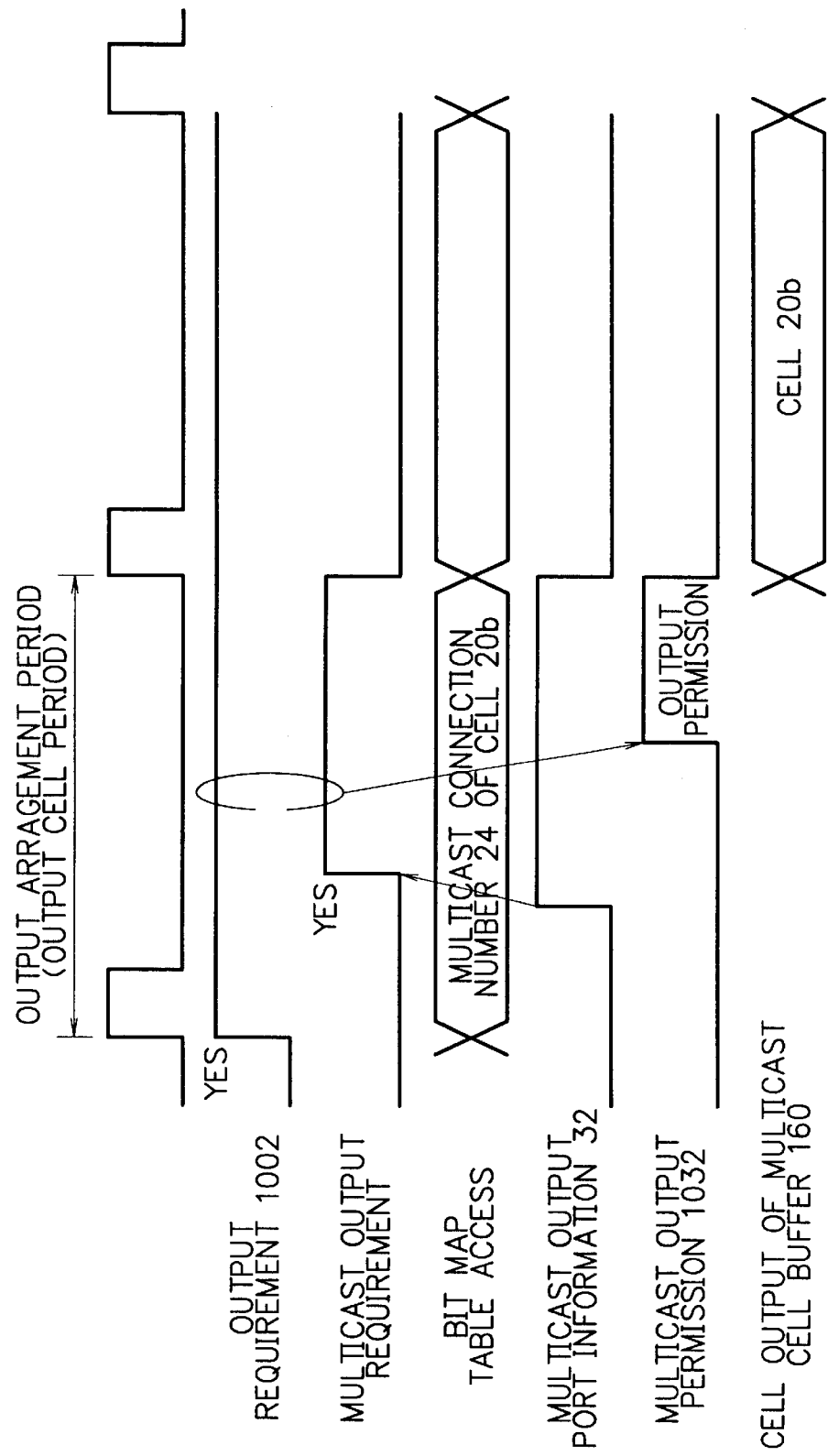

OUTPUT BUFFER TYPE ATM EXCHANGE DEVICE AND MULTICAST CONTROL METHOD

BACKGROUND OF THE INVENTION

The present invention relates to an output buffer type ATM (Asynchronous Transfer Mode) device and a multicast control method which have multicast function for outputting cell inputted from a certain input port to a plurality of output ports.

DESCRIPTION OF THE PRIOR ART

A transmission mode such as asynchronous transfer mode (ATM) converts various kinds of information such as voice, image, data and so forth into cell to be a fixed length packet to execute switching in high speed. When the cell undergoes routing for one outgoing line from a plurality of incoming lines of the switching device, collision of the cell may occur, resulting in disappearance of the cell. It is necessary to prevent disappearance of the cell caused by collision. In order to prevent disappearance of the cell, there is proposed the switching device and/or the switching method having a buffer storing therein the cell temporarily. As one of them, there is an output buffer type ATM exchange device. The output buffer type ATM switching device is provided with buffer in every outgoing line at a rear stage of a switch.

The output buffer type ATM exchange device is provided with a plurality of input ports and a plurality of output ports. In the case where, the cell undergoes routing from a plurality of input ports to one output port, it causes a plurality of the cells to be stored in to the buffer prepared in every respective output ports temporarily. For that reason, it is capable of avoiding disappearance of the cell caused by instantaneous collision.

On the other hand, in such the switching device, not only there is provided a connection (uni-cast) for causing the cell inputted from a certain input port to be outputted to only certain one output port, not only there is provided a multicast function for outputting the cell inputted from a certain input port to a plurality of output ports.

FIG. 1 is a block diagram explaining the multicast control method of the conventional output buffer type ATM exchange device. Here, there is shown the case where there exists four input ports and four output ports respectively.

In FIG. 1, the output buffer type switching device connects respective input ports 700 to 703 with a cell multiplex circuit 71, the cell multiplex circuit 71 with a time division multiplex bus 72, the time division multiplex bus 72 with respective address filters 730 to 733, the respective address filters 730 to 733 with respective output buffers 740 to 743, and the respective output buffers 740 to 743 with respective output ports 750 to 753 successively. Further, the output buffer type switching device connects the cell multiplex circuit 71 with a bit map table 76, and the bit map table 76 with the respective address filters 730 to 733.

There is described operation of the output buffer type ATM exchange device. The cell multiplex circuit 71 inputs therein the cell from the input ports 700 to 703. The cell multiplex circuit 71 multiplexes the cells from the whole input ports during the time period (hereinafter referred to as input cell period) when the respective input ports transfer one cell. FIG. 2A shows about cell multiplex from the respective input ports in the cell multiplex circuit 71. The cell multiplex circuit 71 repeats this operation in every input cell period.

Further, the cell multiplex circuit 71 multiplexes the cell received from the respective input ports, before monitoring a multicast cell display bit 23 (constitution of ATM cell is shown in FIG. 2, and so on) within the cell. In case of the cell whose present bit indicates "0", namely, in the case of uni-cast cell, it causes multiplexed cell to be outputted to the time division multiplex bus 72 as it is. On the other hand, a cell is a cell whose multicast cell display bit indicates "1", namely, on the occasion that the cell is the multicast cell, it causes the bit map table 70 to be retrieved while taking a multicast connection number 24 from among the multicast cells as address. The multiple output port information obtained is informed to corresponding address filter. The multicast cell undergone retrieval by the bit map table 76 is outputted to the time division multiplex bus 72. Further, when the number of the input port is "m", the cell multiplex circuit 71 is required to operate in the speed more than "m" times of the speed of the respective input ports. According to FIG. 1, the constitution is that the number of the input port is four, therefore, the cell multiplex circuit is required to operate in the speed more than four times of the speed of the input port.

The time division multiplex bus 72 distributes the cell inputted from the cell multiplex circuit 71 among the address filters 730 to 733 in every respective output ports. The address filters 730 to 733 monitors the multicast cell display bit 23 and the output port number 22 concerning the inputted cell. When the multicast cell display bit is "0", namely the cell is uni-cast cell, it causes the cell that the output port number agrees with the own port address which the respective address filters have to be picked, before outputting to corresponding output buffers 740 to 743. Further, the address filters 730 to 733, when the multicast cell display bit is "1", namely, the multicast cell is inputted, it causes the bit map table 76 to be retrieved according to the multicast connection number 24 of among the multicast cell, thus picking the cell about only the port whose obtained output port information indicates "1", before outputting to the corresponding output buffers 740 to 743. The output buffers 740 to 743 accumulates the cell outputted from corresponding address filters 730 to 733. Subsequently, it causes the cell to be outputted while adjusting it to the output port speed in order from the cell which is accumulated in the most earliest order.

For instance, on the supposition that the cell 20d shown in FIG. 6D from the input port 700. On this occasion, on the supposition that the establishment shown in FIG. 5B is implemented with respect to the bit map table 76 for the sake of the routing of the multicast cell. The cell multiplex circuit 71 multiplexes the cell inputted from the input port 700. Simultaneously, since the multicast cell display bit 23 is "1" within these cells, it causes the multicast connection number 24 (=1) within these cells to be outputted to the bit map table 76, before retrieving the multicast output information. The bit map table 76 informs corresponding address filters 731, 732, and 733 to the multicast outputs ports 1, 2, and 3 indicating "1" in the multicast connection number 1 about the multicast output port information.

Next, the cell 20d which is multiplexed in the cell multiplex circuit 71 is distributed among the whole address filters 730 to 733 through the time division multiplex bus 72. The multicast cell display bit 23 of the input cell is "1". The corresponding address filters 731, 732, and 733 to multicast output port information are informed by the bit map table 76. Only the address filters 731, 732, and 733 of the address filters 730 to 733 pick the cell. The cell 20d picked by the address filters 731, 732, 733 is rewritten in the rear stage of output buffers 741, 742, 743 respectively. In respective output buffer, when the cell rewritten previously is consumed, before being outputted to respective output ports 751, 752, and 753. Thus, it is capable of performing multicast output of the cell 20d inputted from one input port to three output ports.

However, there are following problems about the multicast control method of the conventional output buffer type ATM switching method.

The problem is that very high speed retrieval processing is required with respect to the bit map table storing therein the output port of the multicast cell. The retrieval processing for the bit map table, on the supposition that the multicast cell is inputted from the whole input port simultaneously, the retrieval processing corresponding number of input port (here, four times) within period of input cell as shown in FIG. 2B is required.

On the other hand, the bit map table uses the multicast connection number as the address. Thus, the bit map table has bit width corresponding to number of the output port as the data. There are various kinds of multicast connection number according to the switching device. In large number of cases, the multicast connection number is prepared corresponding to some kilo to scores of kilo connection. Consequently, hardware quantity of the bitmap table becomes enormous one. The output buffer type ATM exchange device shown in FIG. 1 is constituted by one or a plurality of LSI in order to realize high speed switching processing. However, about the bit map table, since enormous hardware quantity is required as described above, it is incapable of being integrated within LSI, there is provided the memory on the market on the external side of the LSI inevitably, thus there is a limit with regard to the high speed processing.

Namely, relationship between capacity increase of the bit map table and high speed of retrieval processing becomes "trade-off", thus it is difficult to increase capacity (number of input-output port) of the output buffer type ATM exchange device.

SUMMARY OF THE INVENTION

In view of the foregoing, it is an object of the present invention, in order to overcome the above-mentioned problems, to provide an output buffer type ATM exchange device and an output buffer type ATM switching method which enable retrieval processing of a bit map table for the sake of multicast control to be performed in low speed, with the result that it is capable of increasing capacity of the ATM exchange device and it is capable of rendering the bit map table to be large capacity in comparison with the conventional one.

According to a first aspect of the present invention, in order to achieve the above-mentioned object, there is provided an output buffer type ATM (Asynchronous Transfer Mode) exchange device which comprises a cell multiplex circuit for multiplexing a cell inputted from a plurality of input ports to each fixed time slot during input cell period, a time division multiple bus for distributing the cell which is subjected to time division multiplexing by the cell multiplex circuit among a plurality of routes, a plurality of address filters corresponding to output port for picking only cell whose own port address agrees with output port number, and which cell is unicast cell undergoing routing for single output port from among the cells distributed from the time division multiple bus, a plurality of output buffers for accumulating the cells passed through the each address filters respectively to output to corresponding output port while synchronizing with output cell period, a multicast cell filter for picking a multicast cell for performing routing for a plurality of output ports from among the cells distributed from the time division multiple bus, a bit map table for storing therein multicast output port information indicating output port of said multicast cell, and a multicast cell buffer for accumulating multicast cells passed through the multicast cell filter, before taking out multicast output port information of the multicast cell accumulated while referring to the bit map table in every the output cell period to output to corresponding a plurality of output ports.

According to a second aspect of the present invention, in the first aspect, there is provided an output buffer type ATM exchange device, wherein there is provided an output arrangement circuit which receives output requirements of the plurality of output buffers and the multicast cell buffer, before causing the multicast cell to be outputted preferentially when there exists a unicast cell and a multicast cell to be outputted to the same output port.

According to a third aspect of the present invention, in the first aspect, there is provided an output buffer type ATM exchange device, wherein the cell includes an output port number of the unicast cell, a multicast cell display bit for discriminating either the unicast cell or the multicast cell, and a multicast connection number as added control information, and said address filter monitors the multicast cell display bit and output port number, thus picking only the cell whose own port address agrees with the output port number in the unicast cell, and the multicast cell filter picks only the multicast cell while monitoring the multicast cell display bit, and the bit map table associates the multicast connection number with the multicast output port information to store, before responding about the multicast output port information with respect to the multicast connection number of the multicast cell accumulated in the multicast cell buffer.

According to a fourth aspect of the present invention, there is provided a multicast control method of an output buffer type ATM exchange device which comprises the steps of outputting a cell inputted from a plurality of input ports to a time division multiple bus while multiplexing the cell to respective fixed time slot during input cell period, accumulating unicast cell respectively for performing routing for single output port to an output buffer corresponding to the output port from among the cells distributed from the time division multiple bus, outputting the unicast cell to corresponding output port while synchronizing with output cell period, accumulating temporarily the multicast cell for performing routing among a plurality of output ports into the multicast cell buffer from among the cells distributed from the time division multiple bus, picking the multicast output port information which indicates output port of the multicast cell in every the output cell period, performing output arrangement between every respective output ports obtained as the multicast output port information and the unicast cell accumulated in the output buffer, and outputting the multicast cell to corresponding a plurality of output ports preferentially.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 3 is a block diagram showing an embodiment of an output buffer type ATM exchange device of the present invention;

FIGS. 6A to 6D are views showing an input cell;

FIG. 8 is a view showing timing relationship among output arrangement of output arrangement circuit 172, access of the bit map table 161, and cell output of the multicast cell buffer 160.

DETAILED DESCRIPTION OF THE PREFERRED EMBODIMENT

A preferred embodiment of the present invention will be described in detail in accordance with the accompanying drawings.

FIG. 3 is a block diagram showing an output buffer type ATM exchange device of the present invention.

Figures 4, 5A, 5B:
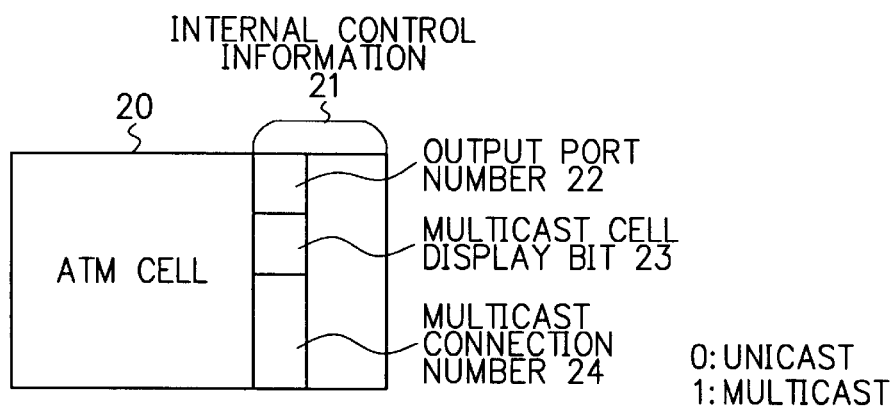
FIG. 4 is a view showing internal control information added to a cell.
FIGS. 5A to 5B are views showing a constitution of a bit map table.

In FIG. 3, input ports 100 to 10m receives therein a cell from a front stage unit (not illustrated) of an exchange containing present exchange device, before outputting to a cell multiplex circuit 11. As shown in FIG. 4, with respect to the cell which is received in the input ports 100 to 10m, an internal control information 21 including routing information and so forth within the exchange is added to the ATM cell 20. The internal control information 21 includes an output port number 22 indicating output port on the occasion of unicast connection, a multicast cell display bit 23 indicating of multicast connection, a multicast connection number 24 for identifying connection (calling) in case of the multicast connection, and so forth. Further, in the multicast cell display bit, "0" is unicast, and "1" is multicast.

Figure 1:
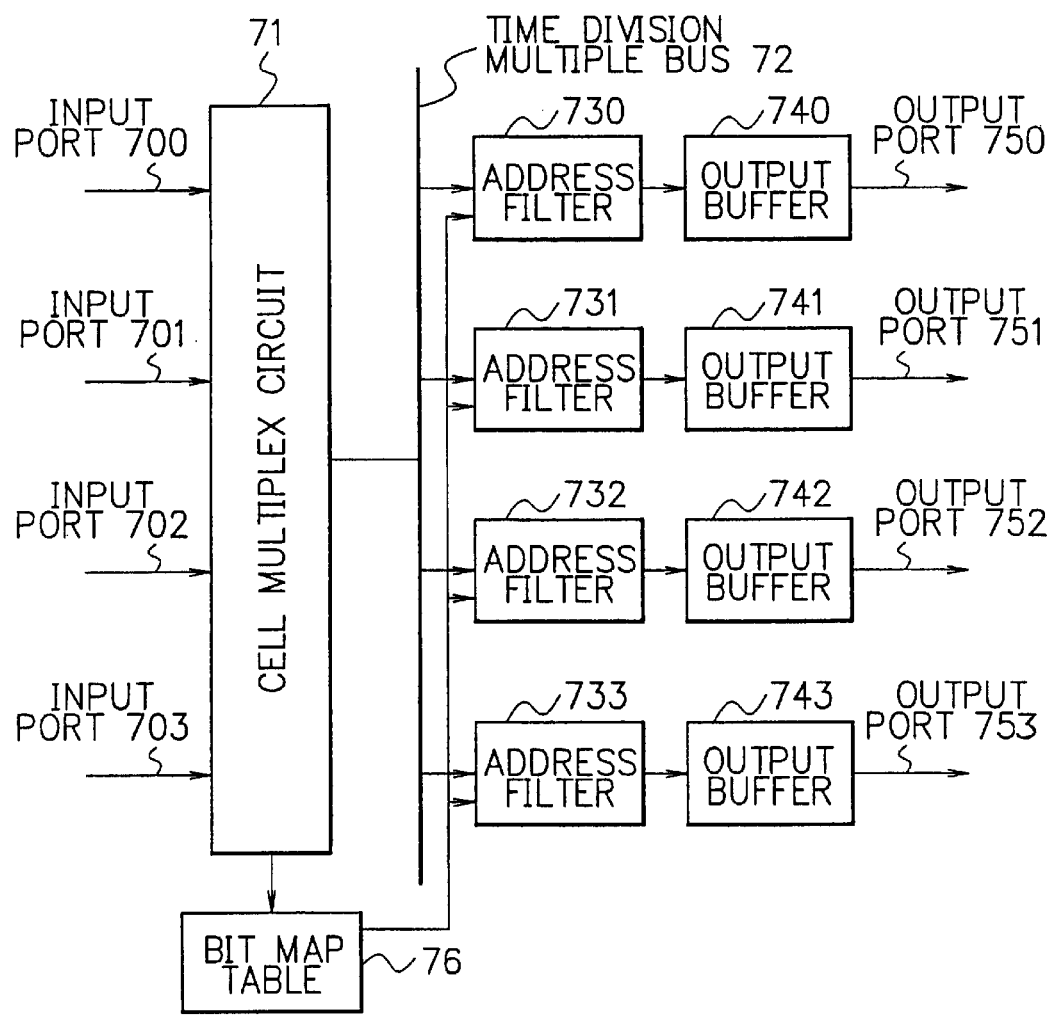
FIG. 1 is a block diagram showing multicast control method of a conventional output buffer type ATM exchange device.
Figure 2:
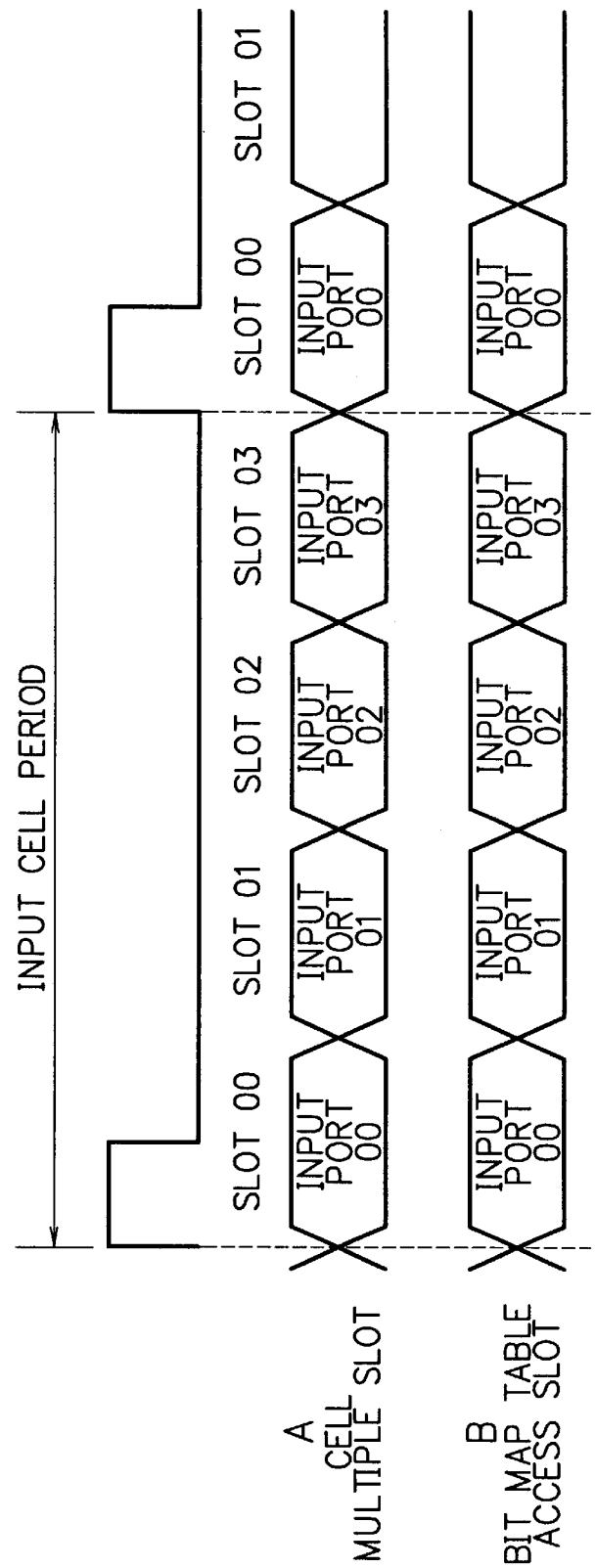
FIGS. 2(A, B) is a view showing cell multiplex and bit map table access operation example.

The cell multiplex circuit 11 multiplexes the cell from the whole input port to fixed time slot successively. On this occasion, the cell multiplex circuit 11 is required to transfer the cell without losing the cell even though when the cell is inputted therein from the whole input ports continuously. The cell multiplex circuit 11 operates with the processing speed for processing the "m" cells from the input port during input cell period, namely the cell multiplex circuit 11 operates more than m times of the input port. FIG. 2A shows this effect of time division multiplex in the cell multiplex circuit 11 when the input port number is taken as four.

The cell which is multiplexed in the cell multiplex circuit 11 is outputted to the time division multiplex bus 12. The time division multiplex bus 12 distributes the inputted cell among the whole address filters 130 to 13n, and the multicast cell filter 14. The address filters 130 to 13n monitors the multicast cell display bit 23 of the inputted cell and the output port number 22. The address filters 130 to 13n pick only the cell that an output port number agrees with own port address which respective address filters have when the multicast cell display bit is "0", namely, the cell is the unicast cell, before outputting to corresponding output buffers 150 to 15n. The multicast self filter 14 picks only the cell whose multicast cell display bit 23 is "1", namely picks the multicast cell to output to the multicast cell buffer 160. The output buffers 150 to 15n and the multicast cell buffer 160 successively accumulate the cell which passes through the address filters 130 to 13n and the multicast cell filter 14 respectively.

The output buffers 150 to 15n inform the output arrangement circuits 170 to 17n corresponding to respective the output buffers 150 to 15n about output requirements 1000 to 100n when the output buffers 150 to 15n accumulate the cell more than one. When the output buffers 150 to 15n obtain output permission 1020 to 102n from the output arrangement circuits 170 to 17n, the output buffers 150 to 15n output the cell to the output ports 190 to 19n through the corresponding OR circuits 180 to 18n in accumulated order.

The multicast cell buffer 160 accumulates the cell more than one. On this occasion, the multicast cell buffer 160 retrieves the bit map table 161 with the multicast connection number 24 of the cell which is accumulated in the most earliest order as the address, to obtain the multicast output port information 30 to 3n. Further, the multicast cell buffer 160 refers to the obtained multicast output port information 30 to 3n. The multicast cell buffer 160 informs the whole output arrangement circuits belonging to the output port of the multicast cell about the multicast output requirements 1010 to 101n. Furthermore, the multicast cell buffer 160 obtains the multicast output permission 1030 to 103n from the output arrangement circuits 170 to 17n. On this occasion, the multicast cell buffer 160 outputs the cell to the output port which the multicast output permission is obtained in order of the length of time they have accumulated.

The bit map table 161, as shown in FIG. 5A, is information of the bit map type having bit width corresponding the number of the output port with the multicast connection number as the address, in which the number "1" is written before hand on the output port of the multicast cell. Further, the bit map table 161 informs the multicast cell buffer 160 about the corresponding "n" bits of the multicast output port information 30 to 3n when the multicast cell buffer 160 informs the bit map table 161 about the multicast connection number 24.

The output arrangement circuits 170 to 17n monitors the output requirement 1000 to 100n from the corresponding respective output buffers 150 to 15n, and the multicast output requirement 1010 to 101n from the multicast cell buffer 160 in every output arrangement period. The output arrangement circuits 170 to 17n implement the arrangement of the output permission with respect to corresponding output buffer or multicast cell buffer. The output buffers 150 to 15n corresponding to respective output ports output the cell with output permission through OR circuits 180 to 18n while synchronizing with output cell period.

Next, there will be described operation of the present embodiment. Here, it causes explanation to be simplified. On the supposition that, in FIG. 3, input port number "m" is taken as 4, output port number "n" is 4, and respective input port speed equals respective output port speed. Consequently, on the supposition that processing speed of the cell multiplex circuit 11 is equal to four times of the input port speed. The processing speed of the time division multiplex bus 12 is equal to four times of the input port speed. The processing speed of the address filters 130 to 133 is equal to four times of the input port speed. The processing speed of the multicast cell filter 14 is equal to four times of the input port speed. The cell write processing speed of the output buffers 150 to 153 is equal to four times of the input port speed. The cell write processing speed of the multicast cell buffer 160 is equal to four times of the input port speed. Further, cell read-out speed from the output buffers 150 to 153, and the multicast cell buffer 160 is a speed that one cell is capable of being read during output arrangement period of the output arrangement circuits 170 to 173. The output arrangement period is the same as the output cell period for outputting one cell from the output port.

Further, the bit map table 161 is established in the condition of FIG. 5B. For instance, on the supposition that "1" is written to the bits 32, and 33 corresponding to the output ports 192, and 193 from among the multicast output port information 30 to 33 corresponding to the multicast connection number 24 (=2).

In FIG. 3, on the supposition that the respective cells 20a, 20b, and 20c of FIGS. 6A, 6B, and 6C are inputted simultaneously from the input ports 100, 102, and 103. The cell 20a is the unicast cell which is subjected to routing toward the output port 192. The cell 20b whose multicast connection number 24 is "2" is the multicast cell for being subjected to routing toward the output ports 192, and 193. The cell 20c is the unicast cell.

Figure 7:
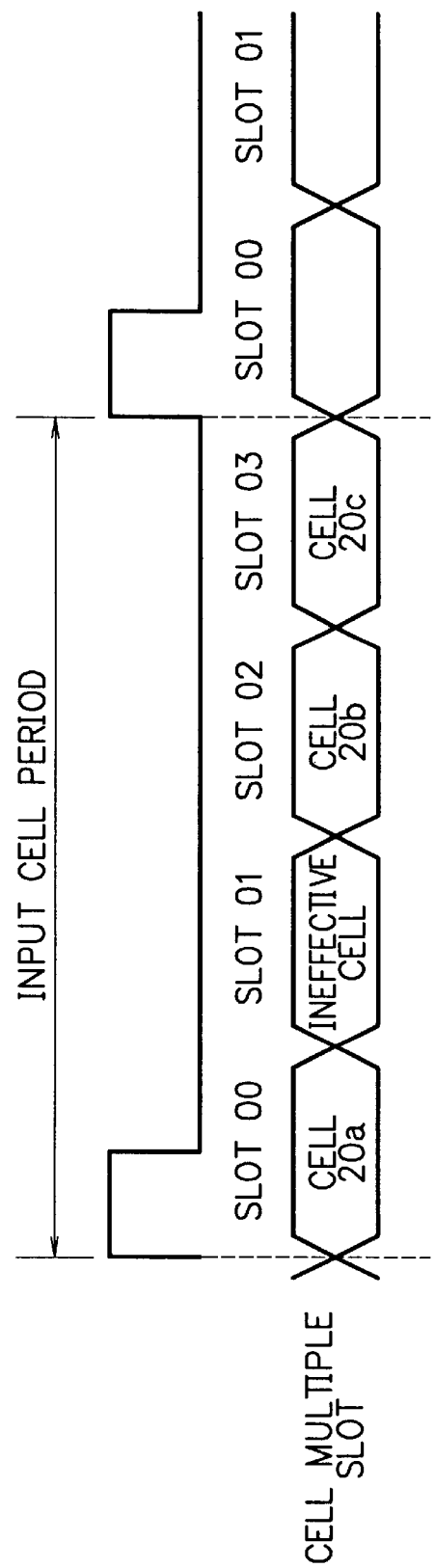
FIG. 7 is a view showing operation example of a cell multiplex circuit 11.

When these input cells are inputted to the cell multiplex circuit 11, as shown in FIG. 7, these input cells are multiplexed toward the slots "00", "02", and "03" in every respective input ports. On this occasion, nothing is multiplexed toward the slot "01", or ineffective cell is multiplexed toward the slot "01". The cell which is multiplexed toward the respective slots is outputted to the time division multiplex bus 12 successively from the cell multiplex circuit 11, thus, the cell is distributed among the whole address filters 130 to 133 and the multicast cell filter 14. The respective address filters have the output port number to which the address filter itself is connected as a port address within the internal part thereof. The address filter picks the cell that is the unicast cell from among the cells distributed from the time division multiplex bus 12 and whose output port number 22 agrees with the port address. Further, the multicast cell filter 14 picks the multicast cell from among the cells distributed from the time division multiplex bus 12. The cells distributed from the time division multiplex bus 12 are discriminated whether the distributed cell is the unicast cell or the multicast cell. It is capable of discriminating the cell due to the fact that it causes the multicast cell display bit 23 within the cell to be monitors.

Here, firstly the cell 20a inputted from the input port 100 is distributed among the address filters 130 to 133 and the multicast cell filter 14 from the time division multiplex bus 12. The cell 20a is the unicast cell whose multicast cell display bit number 23 is "0" and whose output port number 22 is "2", therefore, only the address filter 132 with the port address "2" picks the cell. The address filter and the multicast cell filter with the exception of the address filter 132 do not pick the cell. Next, since the time division multiplex bus 12 distributes the ineffective cell or distributes nothing, thus any address filter and any multicast cell filter do not pick the cell.

Next, the cell 20a inputted from the input port 102 is distributed among the address filters 130 to 133 and the multicast cell filter 14 from the time division multiplex bus 12. The cell 20b is the multicast cell whose multicast cell display bit is "1", therefore, only the multicast cell filter 14 picks the cell, thus the address filters 130 to 133 do not pick the cell. Next, the cell 20c inputted from the input port 103 is distributed among the address filters 130 to 133 and the multicast cell filter 14 from the time division multiplex bus 12. The cell 20c is the unicast cell whose multicast cell display bit 23 is "0", and whose output port number 22 is "1", therefore, only the address filter 131 with the port address "1" picks the cell. The address filter and the multicast cell filter with the exception of the address filter 131 do not pick the cell.

The respective address filters 130 to 133 and the multicast cell filter 14 pick the cell. The output buffers 150 to 153 are connected to rear stages of the respective address filters 130 to 133. The multicast cell buffer 160 is connected to rear stage of the multicast cell filter 14. The cells picked by the respective address filters 130 to 133 and picked by the multicast cell filter 14 are written in the respective output buffers 150 to 153 and the multicast cell buffer 160, before being accumulated temporarily.

The output buffers 150 to 153 accumulate the cell more than one. On this occasion, the output buffers 150 to 153 inform the corresponding output arrangement circuits 170 to 173 about output requirement 1000 to 1003 simultaneously with next output arrangement start. Here, the output buffers 151, and 152 accumulate therein the cells 20c, and 20a respectively. The output buffers 151, and 152 inform respective output arrangement circuits 171, and 172 about the output requirement 1001, and 1002.

The multicast cell buffer 160 accumulates therein the multicast cell more than one. On this occasion, the multicast cell buffer 160 outputs the multicast connection number 24 of the multicast cell to the bit map table 161, that is written in the most earliest order, simultaneously with the next output arrangement start. Here, the multicast connection number 24 (=2) of the cell 20b is informed to the bit map table 161. The bit map table 161 outputs each "0", "0", "1", and "1" as the multicast output port information 30 to 33, because the bit map table 161 is constituted shown in FIG. 5B. The multicast cell buffer 160 informs the output arrangement circuits 172 and 173 belonging to the output ports 192, and 193 about the multicast output requirement 1012, and 1013. With respect to the output ports 192, and 193, the obtained multicast output port information 30 to 33 indicate "1" thereto.

The output arrangement circuits 170 to 173 refer to the output requirements 1000 to 1003 from the output buffers 150 to 153 and the multicast output requirement 1010 to 1013 from the multicast cell buffer 160 in every output arrangement period, thus executing output arrangement in every respective ports. Concretely, the output arrangement circuit 17n belonging to the output port "n" informs the multicast cell buffer 160 about the multicast output permission 103n when there occurs the output requirement 100n and the multi cast output requirement 101n simultaneously in the certain output arrangement period. When there occurs only the multicast output requirement 101n, it causes the multicast output permission 103n to be informed to the multicast cell buffer 160, while when there occurs only the output requirement 100n, it causes the output permission 102n to be informed to the output buffer 15n. In another cases with the exception of above described cases, it causes the no output permission 102n and also the no multicast output permission 103n to be informed.

Here, there is no output requirement 1000 and no multicast output requirement 1010 in the output arrangement circuit 170, therefore, it causes no output permission 1020 and no multicast output permission 1030 to be informed. Since there is only the output requirement 1001 in the output arrangement circuit 171, it causes the output permission 1021 to be informed to the output buffer 151. Since there are both of the output requirement 1002 and the multicast output requirement 1012 in the output arrangement circuit 172, it causes the multicast output permission 1032 to be informed to the multicast cell buffer 160. Since there is only the multicast output requirement 1013 in the output arrangement circuit 173, it causes the multicast output permission 1033 to be informed to the multicast cell buffer 160.

The output buffers 150 to 153 are informed the output permissions 1020 to 1023 from corresponding output arrangement circuits 170 to 173. On this occasion, the output buffers 150 to 153 withdraws the output requirements 1000 to 1003, further, the output buffers 150 to 153 output the cell which is written in the most earliest order to the OR circuits 180 to 183 belonging to the port which had received output permission, simultaneously with start of the next output arrangement. On this occasion, when the cell is accumulated therein with the exception of the cell to be outputted, it causes the output requirement 1000 to 1003 to be informed again.

The multicast cell buffer 160 is informed the multicast output permission 1030 to 1033 from the output arrangement circuits 170 to 173. On this occasion, the multicast cell buffer 160 withdraws the corresponding multicast output requirements 1010 to 1013, further, outputting the cell which is written in the most earliest order to the OR circuits 180 to 183 belonging to the port which had received the multicast output requirement, simultaneously with the start of the next output arrangement. On this occasion, when the cell is accumulated therein with the exception of the cell to be outputted, it causes the bit map table 161 to be retrieved again, further causing information of the multicast output requirement to be executed.

The bit map table 161 undergoes access from the multicast cell buffer 160, before stopping output of the multicast output port information 30 to 33 after next output arrangement starts. If not, it causes next access to be waited while rendering the whole state to be "0".

Here, the cell 20c is outputted to the output port 191 through the OR circuit 181 from the output buffer 151. The cell 20b is outputted to the output ports 192, and 193 through the OR circuits 182, and 183 from the multicast cell buffer 160. On the other hand, the cell 20a accumulated in the output buffer 152 is not outputted, thus remaining the state of accumulation. The output buffer 152 informs the output requirement 1002 in next output arrangement period too.

FIG. 8 shows timing relationship of the output arrangement of the output arrangement circuit 172, the access of the bit map table 161, the cell output of the multicast cell buffer 160 of the present embodiment. Here, there is shown the case where the multicast cell buffer 160 implements access to the bit map table 161 and information of multicast output requirement with respect to one multicast cell during the same output arrangement period. However, it is also suitable that it causes access to the bit map table to be executed during one-previous output arrangement period to acquire to be maintained the multicast output port information. It causes existence of the multicast output requirement to be judged until next start of the output arrangement period.

As described-above, the output buffer type ATM exchange device and the multicast control method of the present invention are capable of greatly delaying retrieval processing of the bit map table storing therein the output port information of the multicast cell in comparison with the conventional constitution.

The reason thereof is as follows: In the conventional constitution, the input port inputs therein the multicast cell. It causes retrieval of the bit map table to be executed before writing the multicast cell to the output buffer. Such the processing is required to implement corresponding to the number of times of the input port number "m" during the input cell period. On the other hand, the device and the method of the present invention are provided with the multicast cell buffer for accumulating the multicast cell. It enables the multicast output to be performed due to retrieval of the bit map table on the occasion of the output arrangement. It is suitable that the retrieval processing of the bit map table is performed in every one output arrangement period, namely, the retrieval processing is performed one time in every output cell period. Further, the output cell period is the same time as that of the input cell period. Consequently, the retrieval processing of the bit map table for the sake of the multicast control becomes possible to delay greatly rather than the conventional constitution. Further, it becomes to increase capacity of the ATM exchange device because it is capable of delaying the retrieval processing for the bit map table.

While preferred embodiments of the invention have been described using specific terms, the description has been for illustrative purposes only, and it is to be understood that changes and variations may be made without departing from the spirit or scope of the following claims.

What is claimed is:

1. An ATM (Asynchronous Transfer Mode) exchange device comprising:
   a cell multiplex circuit for multiplexing a cell inputted from a plurality of input ports to each fixed time slot during input cell period;
   a time division multiple bus for distributing the cell which is subjected to time division multiplexing by said cell multiplex circuit among a plurality of routes;
   a plurality of address filters corresponding to output port for picking only cell whose own port address agrees with output port number, and which cell is unicast cell undergoing routing for single output port from among the cells distributed from said time division multiple bus;
   a plurality of output buffers for accumulating the cells passed through said each address filters respectively to output to corresponding output port while synchronizing with output cell period;
   a multicast cell filter for picking a multicast cell for performing routing for a plurality of output ports from among the cells distributed from said time division multiple bus;
   a bit map table for storing therein multicast output port information indicating output port of said multicast cell; and
   a multicast cell buffer for accumulating multicast cells passed through said multicast cell filter, before taking out multicast output port information of the multicast cell accumulated while referring to said bit map table in every said output cell period to output to corresponding a plurality of output ports.

2. An ATM exchange device as claimed in claim 1, wherein there is provided an output arrangement circuit which receives output requirements of said plurality of output buffers and said multicast cell buffer, before causing the multicast cell to be outputted preferentially when there exists a unicast cell and a multicast cell to be outputted to the same output port.

3. An ATM exchange device as claimed in claim 1, wherein said cell includes an output port number of the unicast cell, a multicast cell display bit for discriminating either the unicast cell or the multicast cell, and a multicast connection number as added control information, and said address filter monitors said multicast cell display bit and output port number, thus picking only the cell whose own port address agrees with the output port number in the unicast cell, and said multicast cell filter picks only the multicast cell while monitoring said multicast cell display bit, and said bit map table associates said multicast connection number with said multicast output port information to store, before responding about said multicast output port information with respect to the multicast connection number of the multicast cell accumulated in said multicast cell buffer.

4. A multicast control method of an ATM exchange device comprising the steps of:

outputting a cell inputted from a plurality of input ports to a time division multiple bus while multiplexing the cell to respective fixed time slot during input cell period;

accumulating unicast cell respectively for performing routing for single output port to an output buffer corresponding to the output port from among the cells distributed from said time division multiple bus;

outputting said unicast cell to corresponding output port while synchronizing with output cell period;

accumulating temporarily the multicast cell for performing routing among a plurality of output ports into the multicast cell buffer from among the cells distributed from said time division multiple bus;

picking the multicast output port information which indicates output port of said multicast cell in every said output cell period;

performing output arrangement between every respective output ports obtained as the multicast output port information and the unicast cell accumulated in said output buffer; and outputting the multicast cell to corresponding a plurality of output ports preferentially.

* * * * *